(12) United States Patent
Kayamkulangara et al.

(10) Patent No.: US 11,888,582 B2
(45) Date of Patent: *Jan. 30, 2024

(54) ADAPTIVE INLINE MODULATION TUNING FOR OPTICAL INTERFACES

(71) Applicant: Cisco Technology, Inc., San Jose, CA (US)

(72) Inventors: Sudhir Kayamkulangara, Bangalore (IN); Stefano Binetti, Monza (IT); Rayen Mohanty, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,408

(22) Filed: Jun. 10, 2022

(65) Prior Publication Data

US 2022/0303037 A1 Sep. 22, 2022

Related U.S. Application Data

(63) Continuation of application No. 17/249,547, filed on Mar. 4, 2021, now Pat. No. 11,362,754.

(51) Int. Cl.
*H04J 14/02* (2006.01)
*H04L 41/12* (2022.01)
*H04B 10/40* (2013.01)

(52) U.S. Cl.
CPC ............ *H04J 14/021* (2013.01); *H04B 10/40* (2013.01); *H04L 41/12* (2013.01)

(58) Field of Classification Search
CPC ......... H04J 14/021; H04B 10/40; H04L 41/12
USPC ............................................................ 398/83
See application file for complete search history.

(56) References Cited

U.S. PATENT DOCUMENTS

| | | | | |
|---|---|---|---|---|
| 11,362,754 | B1* | 6/2022 | Kayamkulangara | H04J 14/021 |
| 2002/0012318 | A1* | 1/2002 | Moriya | H04Q 11/0062 |
| | | | | 370/252 |
| 2013/0209093 | A1* | 8/2013 | Tanimura | H04B 10/0775 |
| | | | | 398/32 |
| 2015/0139002 | A1* | 5/2015 | Lee | H04L 1/0019 |
| | | | | 370/252 |
| 2019/0097747 | A1* | 3/2019 | Kim | H04J 14/0278 |

* cited by examiner

*Primary Examiner* — Dalzid E Singh
(74) *Attorney, Agent, or Firm* — Patterson + Sheridan, LLP

(57) ABSTRACT

Embodiments for adaptive inline modulation tuning for optical interfaces is described. The inline modulation tuning is provided by optical nodes, where the optical nodes exchange optical modulation information and node ability information between optical devices in a node pair. An optimal modulation scheme for the node pair is selected based on modulation abilities of each node and associated transceiver, as well as a link quality and performance observed for the optical link.

20 Claims, 7 Drawing Sheets

ADAPTIVE INLINE MODULATION TUNING FOR OPTICAL INTERFACES

CROSS-REFERENCE TO RELATED APPLICATIONS

This application is a continuation of co-pending U.S. patent application Ser. No. 17/249,547 filed Mar. 4, 2021. The aforementioned related patent application is herein incorporated by reference in its entirety.

TECHNICAL FIELD

Embodiments presented in this disclosure generally relate to network communication in optically based connected networks. More specifically, embodiments disclosed herein relate to coordinating and updating optical modulation schemes between network nodes in order to optimize or improve network communication between the nodes on the optical network.

BACKGROUND

In packet based optical networks, routers and other optical devices are connected using optical transceivers and fibers between the optical transceivers/devices. The new generation of digital coherent optics (DCO) modules are capable of supporting different and advancing modulation schemes which support higher transmission speeds. However, in current implementations, it is the responsibility of a user/administrator to iteratively configure the modulation schemes at the transceivers/DCO modules on both ends of an optical link and monitor optical performance parameters. The user/administrator must then decide on an optimal speed that is acceptable to the optical network and user needs. These user based methods are in turn difficult to implement effectively, error prone, and slow to adapt as network conditions such as link quality change.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
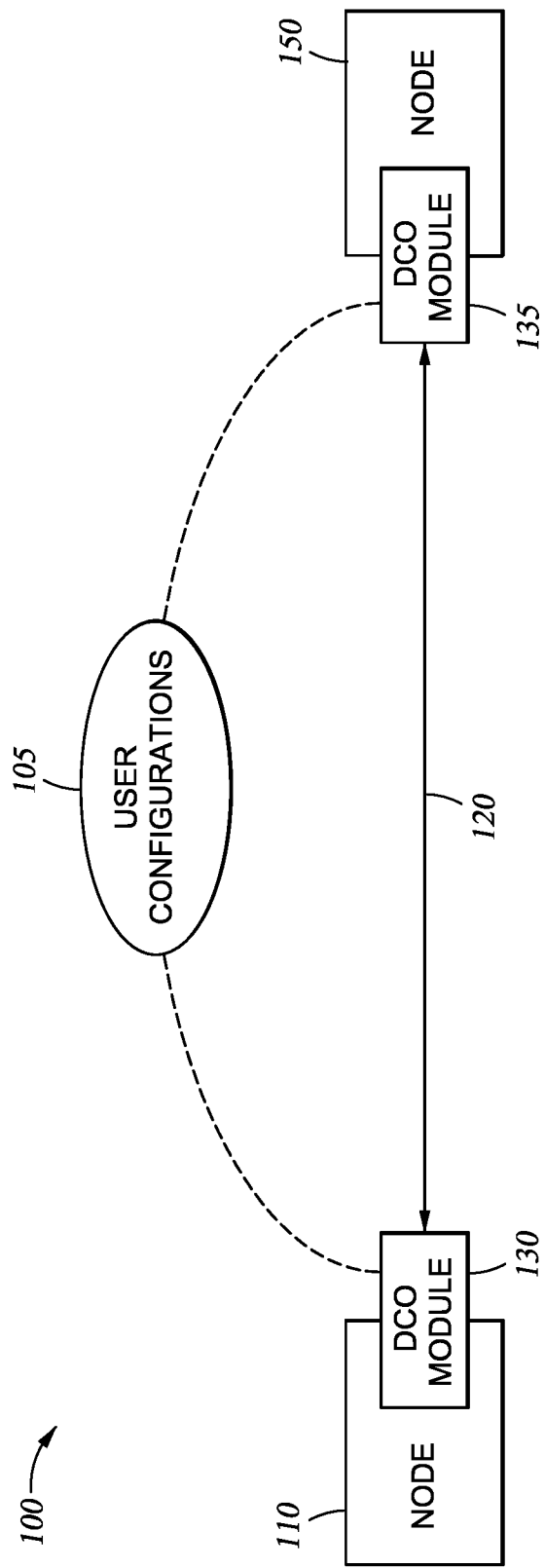
FIG. 1 illustrates a network, according to one embodiment.

A system of one or more computers can be configured to perform particular operations or actions of various methods by virtue of having software, firmware, hardware, or a combination of them installed on the system that in operation causes or cause the system to perform the actions. Additionally, one or more computer programs can be configured to perform particular operations or actions by virtue of including instructions that, when executed by data processing apparatus, cause the apparatus to perform the actions. One example embodiment includes a method for adaptive inline modulation tuning for optical interfaces. The method includes exchanging, at a first node in a node pair in an optical based network, optical modulation information and node ability information with a second node in the node pair and setting the first node as a primary node and the second node as a secondary node based on the node ability information. The method also includes determining, at the primary node, a first modulation scheme for the node pair based on the optical modulation information and setting, at the primary node, the first modulation scheme as an active modulation scheme for the node pair, monitoring, at the primary node, a link quality for a link between the node pair. The method also further includes comparing the monitored link quality to a link quality parameter, and when the monitored link quality is below a threshold, determining an updated modulation scheme based on the comparison of the monitored link quality to the link quality parameter, and setting the updated modulation scheme as the active modulation scheme for the node pair. Other embodiments of this aspect include corresponding computer systems, apparatus, and computer programs recorded on one or more computer storage devices, each configured to perform the actions of the methods.

Another example embodiments includes a system. The system includes one or more computer processors and a memory containing a program which when executed by the one or more computer processors performs an operation. The operation may include exchanging, at a first node in a node pair in an optical based network, optical modulation information and node ability information with a second node in the node pair, setting the first node as a primary node and the second node as a secondary node based on the node ability information, and determining, at the primary node, a first modulation scheme for the node pair based on the optical modulation information. The operation also includes setting, at the primary node, the first modulation scheme as an active modulation scheme for the node pair, monitoring, at the primary node, a link quality for a link between the node pair, and comparing the monitored link quality to a link quality parameter. When the monitored link quality is below a threshold, the operation also includes determining an updated modulation scheme based on the comparison of the monitored link quality to the link quality parameter and setting the updated modulation scheme as the active modulation scheme for the node pair.

Another example embodiments includes a computer-readable storage medium having computer-readable program code embodied therewith, where the computer-readable program code is executable by one or more computer processors to perform an operation. The operation may include:

exchanging, at a first node in a node pair in an optical based network, optical modulation information and node ability information with a second node in the node pair, setting the first node as a primary node and the second node as a secondary node based on the node ability information, and determining, at the primary node, a first modulation scheme for the node pair based on the optical modulation information. The operation also includes setting, at the primary node, the first modulation scheme as an active modulation scheme for the node pair, monitoring, at the primary node, a link quality for a link between the node pair, and comparing the monitored link quality to a link quality parameter. When the monitored link quality is below a threshold, the operation also includes determining an updated modulation scheme based on the comparison of the monitored link quality to the link quality parameter and setting the updated modulation scheme as the active modulation scheme for the node pair.

Example Embodiments

In optical based communication networks, optical devices in the network are typically connected to each other using optical transceivers and optical fibers. As optical networks are increasingly deployed and utilized for a variety of different functions from business/enterprise use to consumer based utilization, improvements in reliability and speed of the networks is increasingly important. As part of the development and improvement of optical networks, new transceivers, such as digital coherent optics (DCO) modules provide new high-bandwidth optical modulation schemes that can improve the speed and bandwidth of communication in optical networks.

For example, the high-bandwidth modulation schemes such as Quadrature Phase Shift Keying (QPSK), 8 Quadrature amplitude modulation (QAM), 16QAM, etc. may support speeds ranging from 200 gigabits-per-second (Gbps) to 800 Gbps. As these faster modulation schemes are created and improved, new hardware/software in optical networks is implemented to take advantage of the various modulation schemes. In some examples, not every transceiver and optical network may be capable of efficiently using the highest available modulation schemes, which creates implementation hurtles when the modulation schemes are attempted in optical networks.

In some examples, to optimize the modulation scheme between two links in an optical network, a user or network administrator iteratively configures the modulation scheme between the links and observes the outcome. This results in a large amount time and resource usage devoted to attempting to set up an optical network and can result in optical networks failing to operate at maximum or optimal speeds.

The systems and methods described herein provide adaptive inline modulation tuning for optical interfaces by exchanging optical modulation information and node ability information between optical devices in a node pair in an optical link and programmatically selecting an optimal modulation scheme for the node pair based on modulation abilities of each node and associated transceiver, as well as a link quality and performance observed for the optical link.

FIG. 1 illustrates a network 100, according to one embodiment. The network 100 includes network nodes in a node pair, including node 110 and node 150. The nodes 110 and 150 are connected via an optical connection 120. The nodes 110 and 150 may include any type of computing device capable of providing optical communication, such as an optical router, optical device, etc. The optical connection 120 may include any types of optical communication medium which uses light or light energy to various types of information. In some examples, the network 100 is a local area network (LAN) where the optical connection 120 is a relatively short optical connection over a smaller geographical area (e.g., a data center, campus network etc.). In some examples, the network 100 is a wide area network (WAN), where the optical connection 120 is a relatively longer optical connection over a wider geographic area.

In some examples, the optical connection 120 is provided by a physical connection means such as a fiber-optic cable physically connected between the node 110 and node 150. In other examples, the optical connection 120 may also be a wireless connection (e.g., optical/light communication through free space, etc.). In both examples, in order to provide effective communication between the nodes 110 and 150, the nodes include transceivers/optical communication modules which control the transmission properties of the light in the optical connection 120. For example, the communication modules may control various characteristics such as phase, amplitude, and polarization which enables data transmission between the network nodes. In some examples, the node 110 and the node 150 include DCO modules, such as DCO module 130 and DCO module 135 respectively, which enable the transmission of light and light based communication between the network nodes.

In some examples, the DCO modules 130 and 135 utilize user configurations 105 provided by a user or set by a vendor. The user configurations 105 provide at least one default modulation scheme for the optical communication on the optical connection 120. In some examples, when the DCO modules 130 and 135 utilize only the user provided modulation schemes in the user configurations 105, the user must then observe the network communication including the network speed and other network performance measures in order to manually improve or alter the modulation scheme used by the DCO modules 130 and 135 and improve network performance on the optical connection 120. In some examples, as described in relation to FIG. 2, the node 110 and node 150 provide optimized mechanisms to adapt and update the modulation scheme in the optical connection 120 based on observed connection information such as link quality and specific node capabilities.

Figure 2:
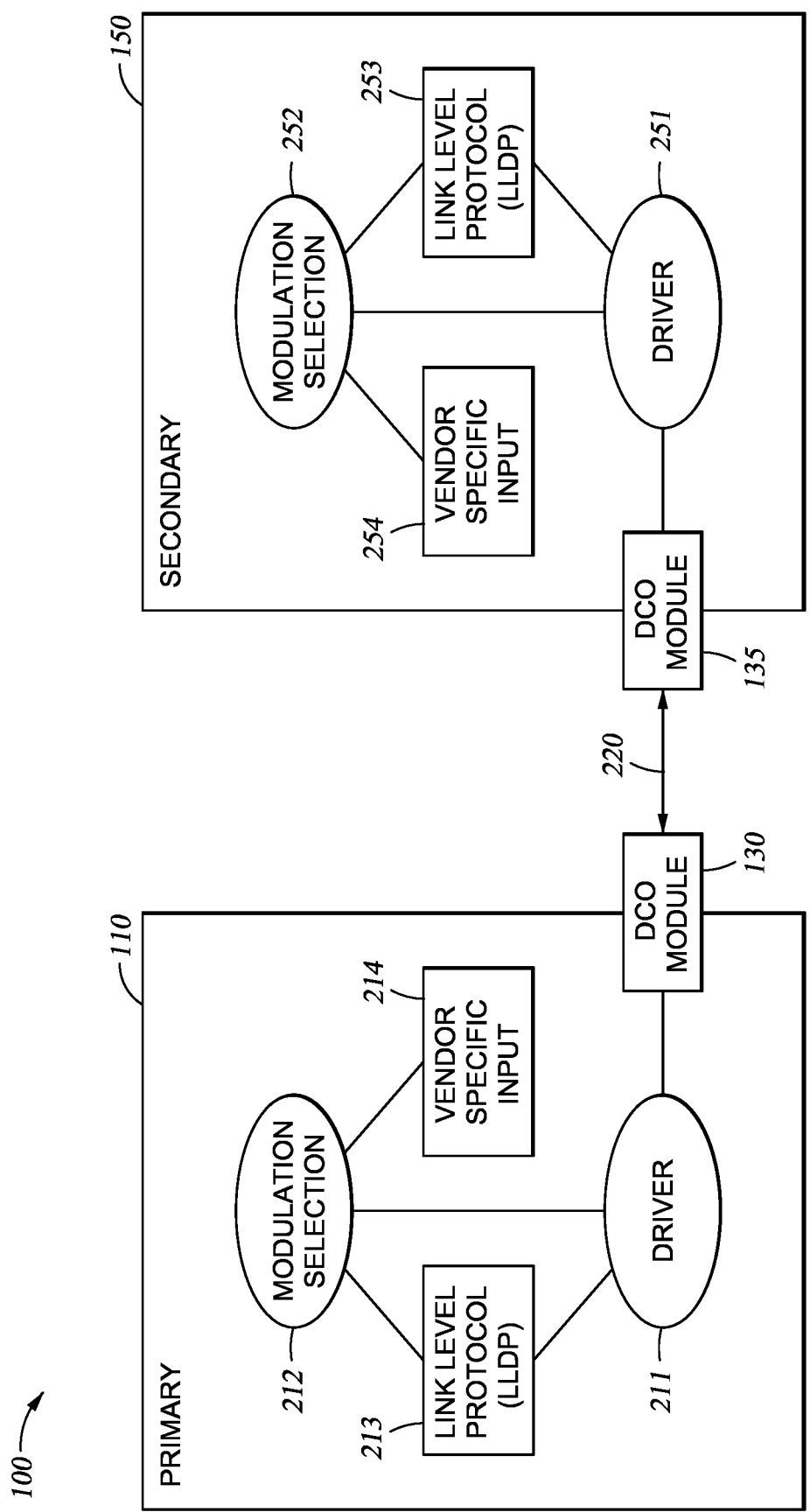
FIG. 2 illustrates network nodes in a network, according to embodiments.

FIG. 2 illustrates network nodes, such as node 110 and node 150 in the network 100, according to embodiments. The network nodes include various modules which provide adaptive inline modulation tuning for the DCO modules and the optical communication between the nodes. In some examples, the node 110 and the node 150 communicate via a communication link 220 over the optical connection 120 shown in FIG. 1. The DCO modules 130 and 135 function as transceivers to provide the link 220. In some examples, the transmitting/receiving abilities and different modulation schemes available to the DCO modules 130 and 135 may be different for each module and node. For example, the DCO module 130 may be capable of higher level modulation scheme (e.g., a modulation scheme with greater data rates) compared to the DCO module 135. Additionally, various network performance constraints and protocols may influence the capability of each of the DCO modules 130 and 135 to efficiently communicate over the link 220. For example, properties and operating conditions of the optical connection 120 may affect the link 220 during operation. To provide seamless inline adaption to the network conditions, each of the nodes 110 and 150 include different modules which provide adaption capabilities.

For example, the node 110 includes a driver module 211, modulation selection module 212, link layer discovery protocol (LLDP) module 213, and a vendor specific input module 214. The node 150 includes similar modules such as driver module 251, modulation selection module 252, LLDP module 253, and a vendor specific input module 254. For ease of discussion, the modules 211-214 are described in detail herein and the modules 251-254 are understood to perform similar functions and methods.

In some examples, the driver module 211 provides control over a process to adapt/optimize the modulation scheme for the link 220 and interacts with the additional modules in the node 110 to perform various functions. For example, when the link 220 is initialized or brought up, the driver module 211 initiates an exchange of optical modulation information and node ability information with the connected node on the other end of the link 220, node 150. In some examples, the exchange may utilize vendor or user specific communications to exchange the optical modulation information and node ability information.

In some examples, existing network protocols are used to exchange the information between the nodes. For example, the driver module 211 in conjunction with the LLDP module 213 may compile a LLDP type-length-value (TLV) structure which includes available modulation capabilities at the node 110 and state machine functionality for node 110. In some examples, the driver module 211 also receives an LLDP TLV structure from the node 150 which includes modulation capabilities at the node 150 and state machine functionality for the node 150.

In some examples, the available modulation schemes for the node 110 are based on the hardware and software capabilities of the node 110 and the DCO module 130. For example, the DCO module 130 is enabled to transmit/receive in a given number of modulation schemes based on the hardware type of the transceiver, etc. In some examples, the available modulation schemes may change or update over time based on user provided information or updates to the node 110, etc. Additionally, the received available modulation schemes for the node 150 may also include a given number of modulation schemes based on the hardware type of the transceiver, etc. for the DCO module 135. The node 110 utilizes this information for both nodes to determine modulation schemes that may implemented over the link 220 as described herein in relation to FIGS. 3-4.

In some examples, the state machine functionality for the node 110 is based on available software and hardware for providing control over adjusting modulation for the link 220. For example, the node 110 includes the modules 211-214 which may provide primary functionality as a primary node for the modulation scheme adjustment described herein. In some examples, when the node 110 does not include the modules 211-214 the node 110 functions as a secondary node, which adjusts modulation according to a primary node instruction. In some examples, when both node 110 and node 150 are capable of primary functionality for adjusting modulation schemes for the link 220, the primary node may be set by a user (e.g. a vendor) and/or by the method described herein in relation to FIG. 5. In some examples, upon determining that the node 110 is the primary node, the node 110 begins optimizing the modulation schemes for the link 220.

For example, the driver module 211 interacts with the modulation selection module 212 to determine an optimal modulation scheme which is available at both the node 110 and the node 150 based on the modulation capabilities at the node 110 and modulation capabilities received from the node 150. In some examples, the modulation scheme is adjusted based on network conditions such as link quality and vendor specific parameters provided by the vendor specific input module 214. The vendor specific input module 214 may include a variety of parameters and algorithms to assess the quality or state of the link 220 based on observed network conditions.

For example, a vendor/user/administrator may require that an error rate in the link 220 be below a threshold and/or that a speed/bandwidth be within a specified range. As the modulation scheme in the link 220 is adjusted/updated, the various network conditions may be fed into the vendor specific input module 214 to determine whether a current modulation scheme is acceptable or within the various parameters set by the vendor/user. The adjustment and updating of modulation to optimize the link 220 according to the vendor specific input module 214 inputs and other configurations is described in more detail in relation to FIGS. 3-6 herein.

Figure 3:
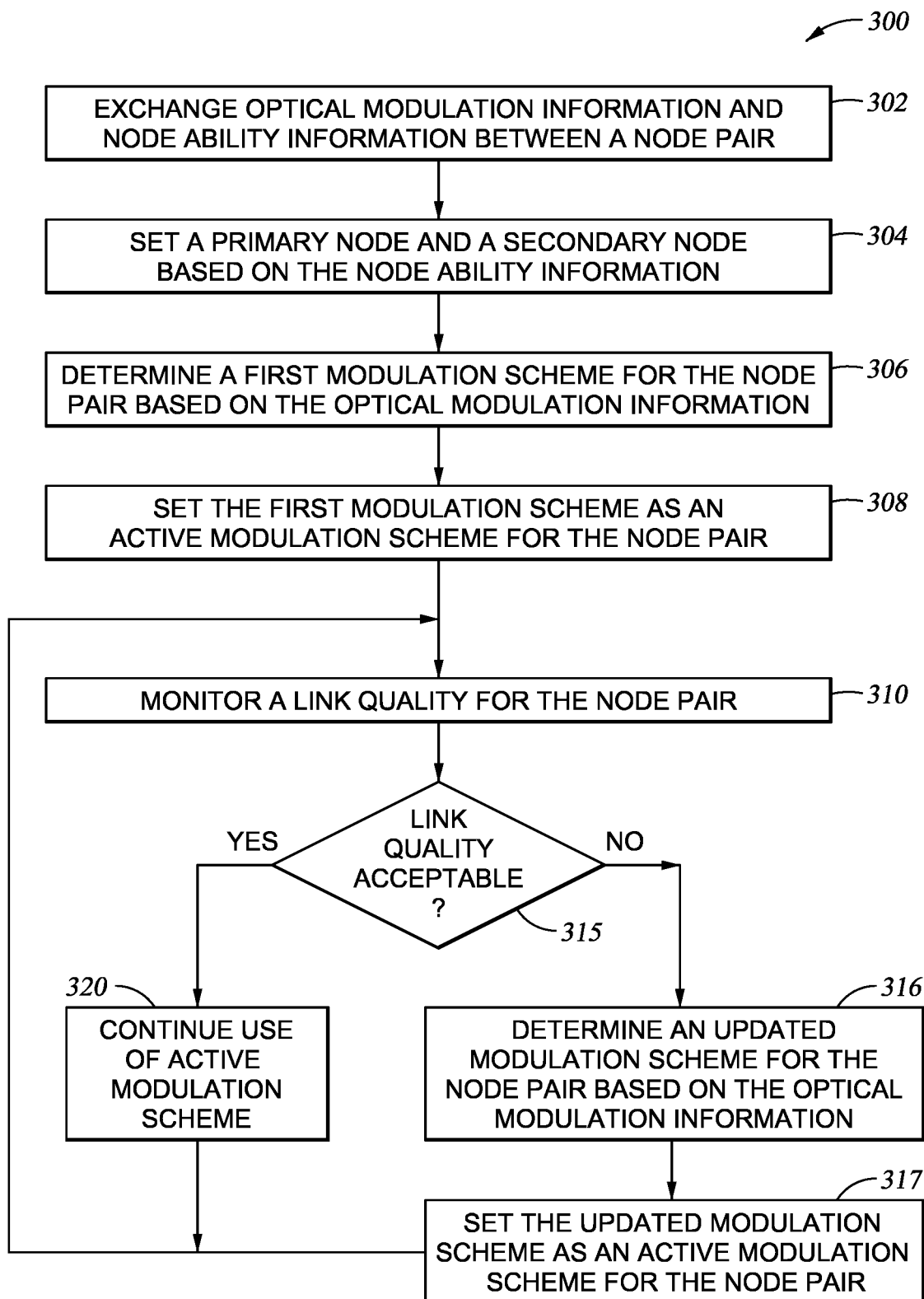
FIG. 3 is a method for adaptive inline modulation tuning, according to one embodiment.

FIG. 3 is a method 300 for adaptive inline modulation tuning, according to one embodiment. For ease of discussion, the methods described in FIGS. 3-6 will be described as being performed by node 110 acting as a primary node for the link 220 as shown in FIG. 2, where the node 150 functions as the secondary node. In some examples, the node 150 may also function as the primary node instead of the node 110 and the node 110 may function as the secondary node. The methods in FIGS. 3-6 may also be performed by the network device 701 described in relation to FIG. 7 which includes various modules and hardware/software components for performing the operations of the methods.

Method 300 begins at block 302 where the node 110, as a first node in a node pair, exchanges in an optical based network, e.g. the network 100, optical modulation information and node ability information with a second node in the node pair (e.g., the node 150). In some examples, the exchange of the optical modulation information and node ability information occurs at an initiation or start of the link 220, during a link discovery process, or as the link is being brought up between the nodes in the node pair. The exchange may also occur at a time specified by a user/vendor indicating optimization of the modulation scheme is desired. For example, the exchange may be initiated by a user/administrator at any time while the link 220 is operating.

Additionally, the exchange of optical modulation information and node ability information may be exchanged periodically as the communication occurs on the link 220. For example, the nodes 110 and 150 may receive an ability update which changes the state machine functionality and/or the modulation schemes available at each of the nodes. In some examples, the node 110 utilizes an LLDP process provided by the LLDP module 213 to exchange optical modulation and node ability information as described in relation to FIG. 4.

At block 304, the node 110 sets itself as a primary node for the node pair and the second node, node 150, as a secondary node for the node pair, based on the node ability information exchanged between the node pair. In some examples, the node 110 and the node 150 may both be capable of serving as the primary node but only one of the nodes is selected as the primary node. Techniques for selecting which node is to be the primary node and which is the secondary node is described in relation to FIG. 5. While the node 110 functions as the primary node described herein, some processes may also occur at the secondary node, node 150, such as the compilation and transmission of optical modulation information and node ability information for the node 150, as well as network condition/link quality information.

Figure 6:
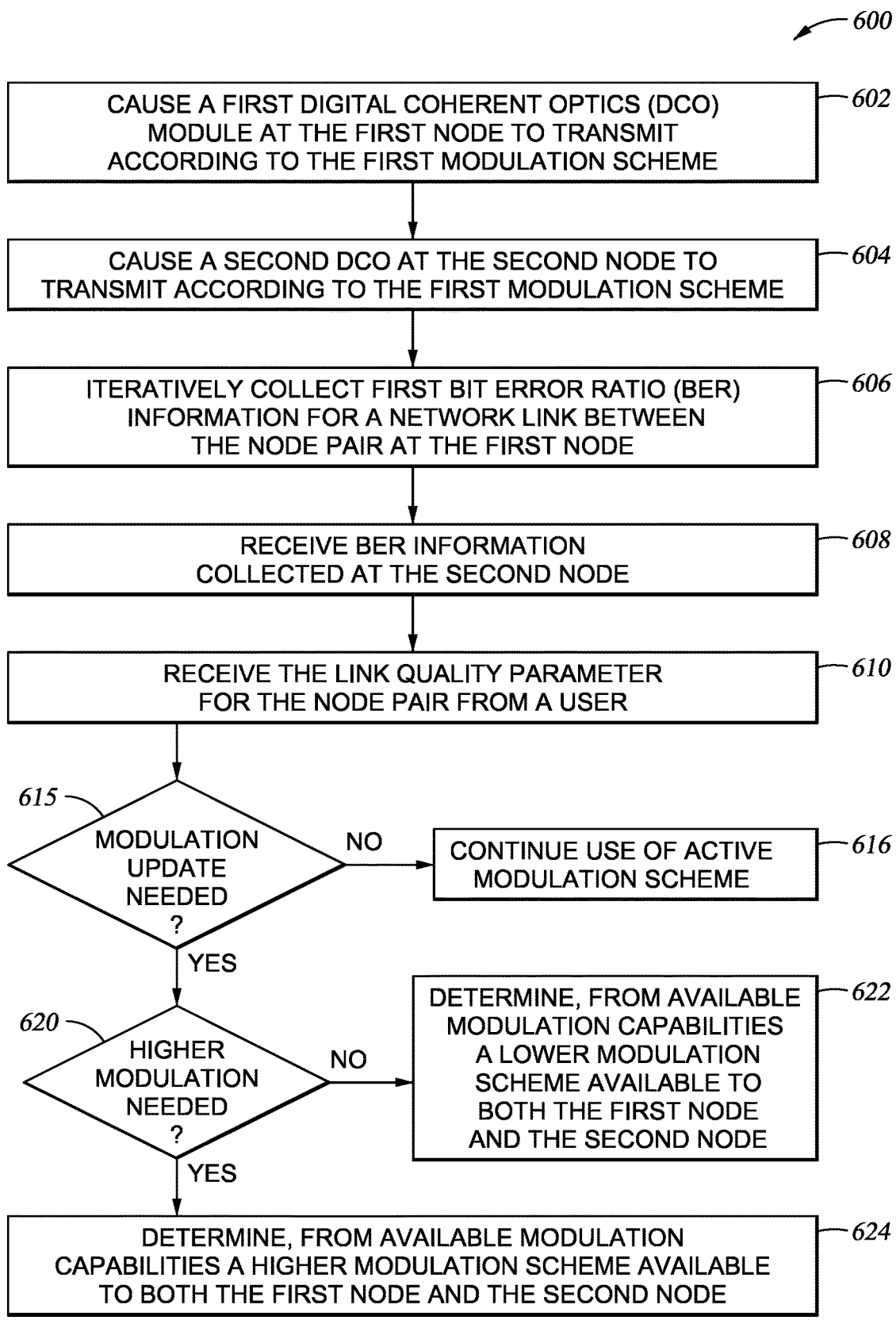
FIG. 6 is a method for adaptive inline modulation tuning, according to one embodiment.

When the primary node is determined, the node 110 begins adaptive optimization of the modulation scheme used over link 220 as described in relation to blocks 306-320 and in relation FIG. 6. For example, at block 306, the node 110 determines a first modulation scheme for the node pair based on the exchanged optical modulation information (i.e., the optical modulation information from both the node 110 and the node 150).

At block 308, the node 110 sets the first modulation scheme as an active modulation scheme for the node pair. For example, the driver module 211 causes both the DCO module 130 and the DCO module 135 to transmit data and communication information over the link 220 using the first modulation scheme and begins monitoring the link 220 to determine whether the speed and transmission abilities of the link 220 may be optimized.

At block 310, the node 110 monitors, at the primary node, a link quality for a link between the node pair. For example, a link quality measure such as Bit Error Ratio (BER) is monitored by both the primary and secondary nodes and is periodically compared to a link quality parameter such as vendor specific measures and algorithms which provide link quality expectations for the link 220. While described herein in relation to BER measures, other relevant performance monitoring parameters may also be used for link quality measurements.

At block 315, the node 110 compares the monitored link quality to a link quality parameter to determine when the link quality is acceptable or unacceptable. For example, when the monitored link quality is below a threshold as determined by comparison to the vendor specific measures and algorithms in the vendor specific input module 214, method 300 proceeds to block 316.

At block 316, the node 110 determines an updated modulation scheme based on the comparison of the monitored link quality to the link quality parameter. In some examples, the updated modulation scheme is a higher or a lower modulation scheme available at both the nodes 110 and 150, where the determination/selection of the updated modulation scheme is described in more detail in relation to FIG. 6.

At block 317, the node 110 sets the updated modulation scheme as the active modulation scheme for the node pair. For example, the driver module 211 causes both the DCO module 130 and the DCO module 135 to transmit using the updated modulation scheme and returns to block 310 to monitor the link 220 to determine whether the speed and transmission abilities of the link 220 may be optimized further.

In some examples, when the link comparison at block 315 indicates the link quality is acceptable, method 300 proceeds to block 320, where the node 110 continues use of the active modulation scheme. For example, the node 110 may not alter the modulation scheme for the link 220 or may indicate to the DCO modules 130 and 135 to continue to utilize the active modulation scheme. As described above, the determination of the first modulation scheme and the updated modulation scheme is based on the information exchanged between the node pair as described in relation to FIG. 4.

Figure 4:
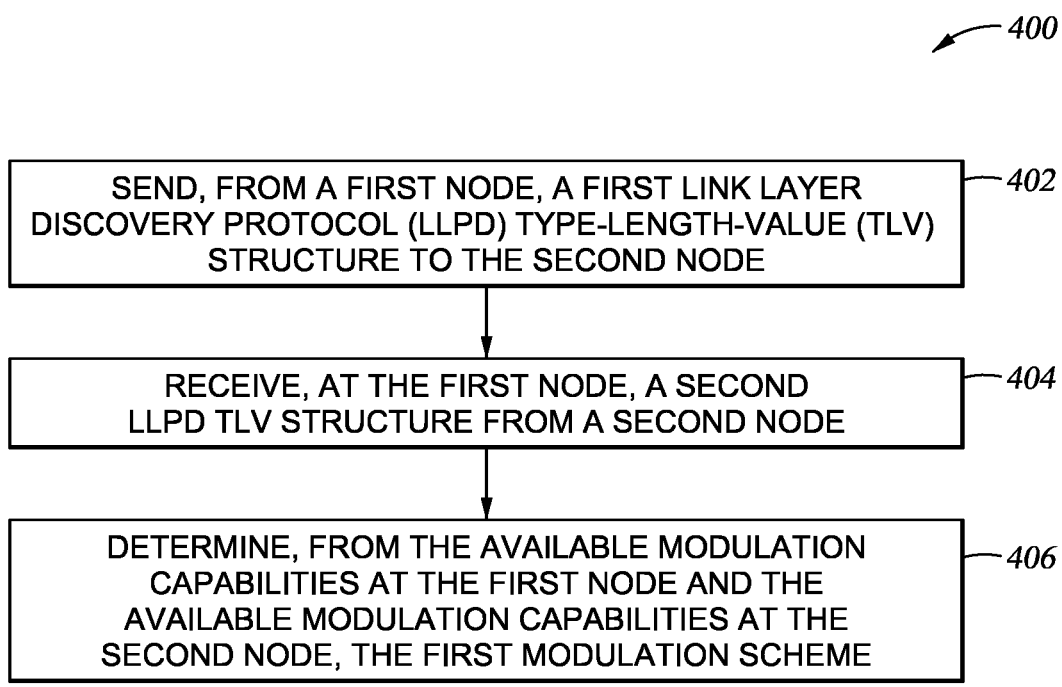
FIG. 4 is a method for exchanging optical modulation information and node ability information, according to one embodiment.

FIG. 4 is a method 400 for exchanging optical modulation information and node ability information, according to one embodiment. Method 400 begins at block 402 where the node 110 sends a first LLDP TLV structure to the second node, the node 150, where the first LLDP TLV includes available modulation capabilities at the node 110 and state machine functionality for the node 110. In some examples, the LLDP module 213 and driver module 211 compile the available modulation capabilities/schemes for the DCO module 130 and the state machine functionality for the node 110 in the LLDP TLV structure for transmission of the TLV structure to the other node in the node pair.

At block 404, the node 110 receives a second LLDP TLV structure from the second node, node 150, where the second LLDP TLV structure comprises available modulation capabilities at the second node and state machine functionality for the second node. In some examples, the node 110 stores the second LLDP TLV structure for access by the driver module 211 and the modulation selection module 212 when performing the methods as described in FIGS. 5-6.

Additionally, in some examples, the node 110 determines the first modulation scheme for the node pair based on the optical modulation information received via the LLDP TKV structure and the optical modulation information at the node 110. For example, at block 406, the node 110 determines, from the available modulation capabilities at the first node and the available modulation capabilities at the second node, the first modulation scheme, where the first modulation scheme includes a modulation scheme available to both the first node and the second node.

In some examples, the first modulation scheme is a lowest modulation scheme available to both nodes in the node pair. The first modulation scheme may also be set by a user/administrator for the nodes 110 and 150. In some examples, the first modulation scheme is provided from the primary node, node 110, to the secondary node, node 150 via control messages over the link 220. While the node 110 is described herein as functioning as the primary node, the node 110 sending the LLDP TLV structure to the node 150 allows for the determination of which node in the node pair should function as the primary node as described in relation to FIG. 5.

Figure 5:
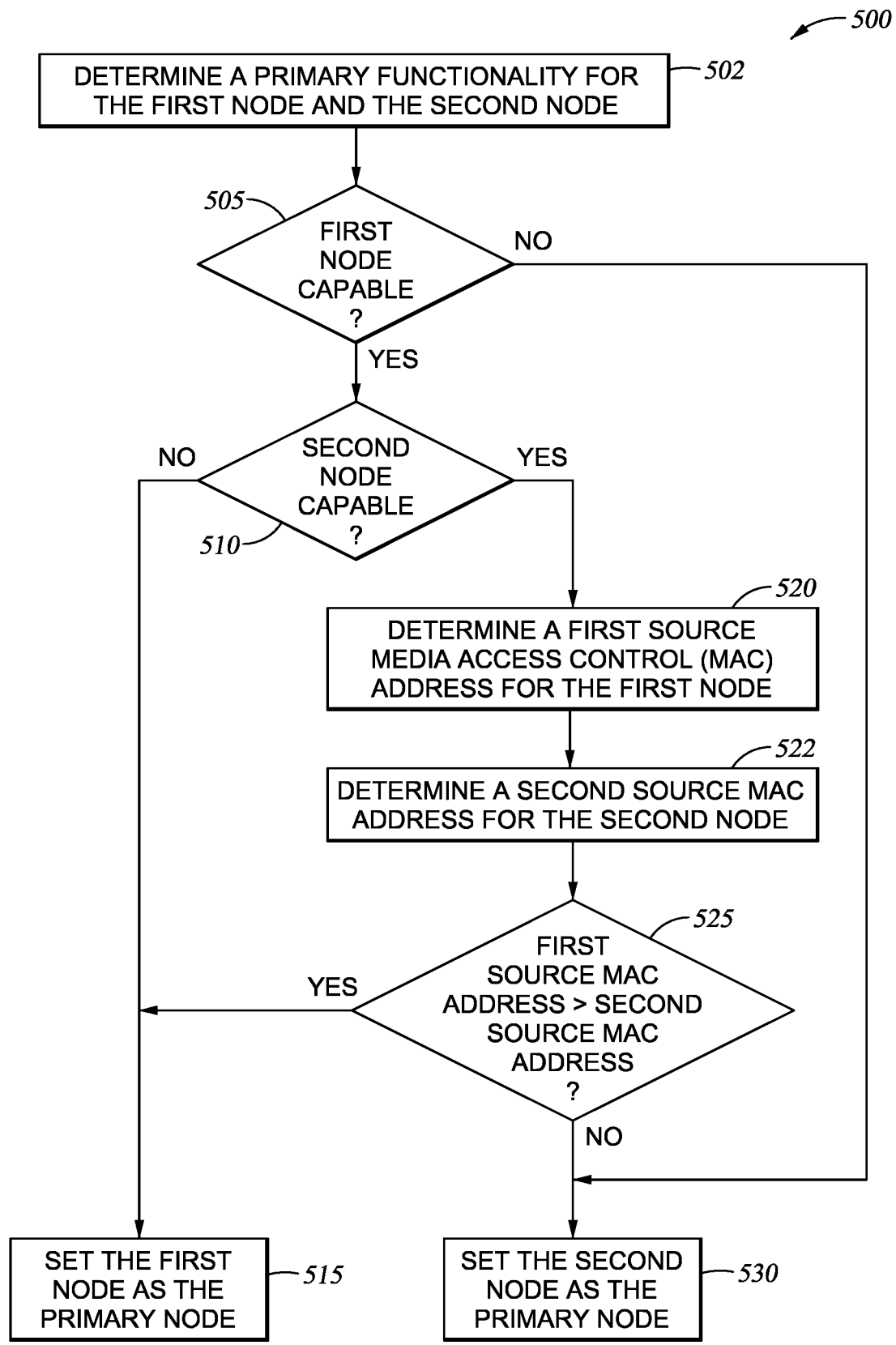
FIG. 5 is a method for setting a primary node and secondary node, according to one embodiment.

FIG. 5 is a method 500 for setting a primary node and secondary node, according to one embodiment. Method 500 begins at block 502 where the node 110 determines a primary functionality for the node 110 and the node 150. At block 505, the node 110 determines whether the node 110 is capable of primary functionality. For example, the node 110 determines from the modules available at the node 110 and/or user specifications whether the node 110 can serve as the primary node for the node pair. In an example where the node 110 is not capable of primary functionality, the method 500 proceeds to block 530, where the second node (e.g., node 150) is set as the primary node. For example, the node 110 will set itself as the secondary node in the node pair.

In an example, where the node 110 is capable of primary functionality, the method 500 proceeds to block 510 where the node 110 determines whether the node 150 is capable of primary functionality. For example, the node 110 determines, from saved state machine functionality for the second node, as described in block 404 of FIG. 4, whether the node 150 can serve as the primary node for the node pair. When the node 110 is capable of primary functionality and the node 150 is not capable of primary functionality, method 500 proceeds to block 515, where the node 110 sets itself as the primary node. In some examples, the node 110 also transmits a control message to the node 150 indicating the node 150 will function as the secondary node.

In another example, when the first node and second node are both capable of primary functionality, method 500 proceeds to block 522. At block 522, node 110, using information exchanged between the node pair, determines a first source media access control (MAC) address for the node 110 and determines a second source MAC address for the node 150 at block 522. At block 525, the node 110 compares the first source MAC address to the second source MAC address to determine which MAC address is higher.

When the first source MAC address is higher than the second source MAC address, method 500 proceeds to block 515 where the node 110 sets itself as the primary node for the link 220. When the first source MAC address is lower than the second source MAC address, method 500 proceeds to block 520 where the second node (e.g., node 150) is set as the primary node. In some examples, once the primary and secondary node roles are assigned the modulation scheme for the node pair can be assigned and optimized/updated as described in FIG. 6.

FIG. 6 is a method for adaptive inline modulation tuning, according to one embodiment. Method 600 begins at block 602 where the node 110 causes the DCO module 130 to transmit according to the first modulation scheme and causes the DCO module 135 at the node 150 to transmit according to the first modulation scheme at block 604. For example, the first modulation scheme as determined in block 406 of FIG. 4, may be assigned as the first active modulation scheme for the node pair and communicated from the primary node, node 110 to the node 150 via a control message. As the DCO modules at the nodes communicate via the first modulation scheme, the node 110 and the node 150 monitor the link quality for the node pair.

For example, at block 606, the node 110 and the node 150 iteratively collects BER information for the network link, link 220, between the node pair. At block 608, the node 110 receives BER information collected at the second node. Upon collection of the link quality information the node 110 may begin comparing monitored link quality to a link quality parameter.

For example, at block 610, the node 110 receives the link quality parameter for the node pair from a user which includes at least one link quality factor and compares the first BER information and the received BER to the link quality parameter at block 615. In some examples, blocks 610 and 615 are performed by the vendor specific input module 214 using user/administrator parameters to determine whether the link quality is sufficient for the desired purposes. At block 615, when the when the link quality is acceptable, method 600 proceeds to block 616 where the nodes 110 and 150 continue use of the current active modulation scheme.

In an example when the link quality is unacceptable, method 600 proceeds to blocks 620-624, where the node 110 determines, from available modulation capabilities at the node 110 and the available modulation capabilities at the node 150, the updated modulation scheme. At block 620, the node 110 determines whether a higher modulation scheme is desired. For example, the vendor specific input module 214 may indicate that higher level modulation scheme is desired for the link 220, e.g., when a link speed is low. In another example, a lower modulation scheme may be desired when the link quality of the link is error prone or experience other adverse conditions.

When a lower modulation scheme is needed, method 600 proceeds to block 622 where the node 110 determines, from available modulation capabilities, a lower modulation scheme available to both node 110 and node 150. When a higher modulation scheme is needed, method 600 proceeds to block 624 where the node 110 determines, from available modulation capabilities, a higher modulation scheme available to both node 110 and node 150. Upon determination of the updated modulation scheme, the node 110 sets the updated modulation scheme as the active modulation scheme and continues monitoring the link as described in relation to FIG. 3.

Figure 7:
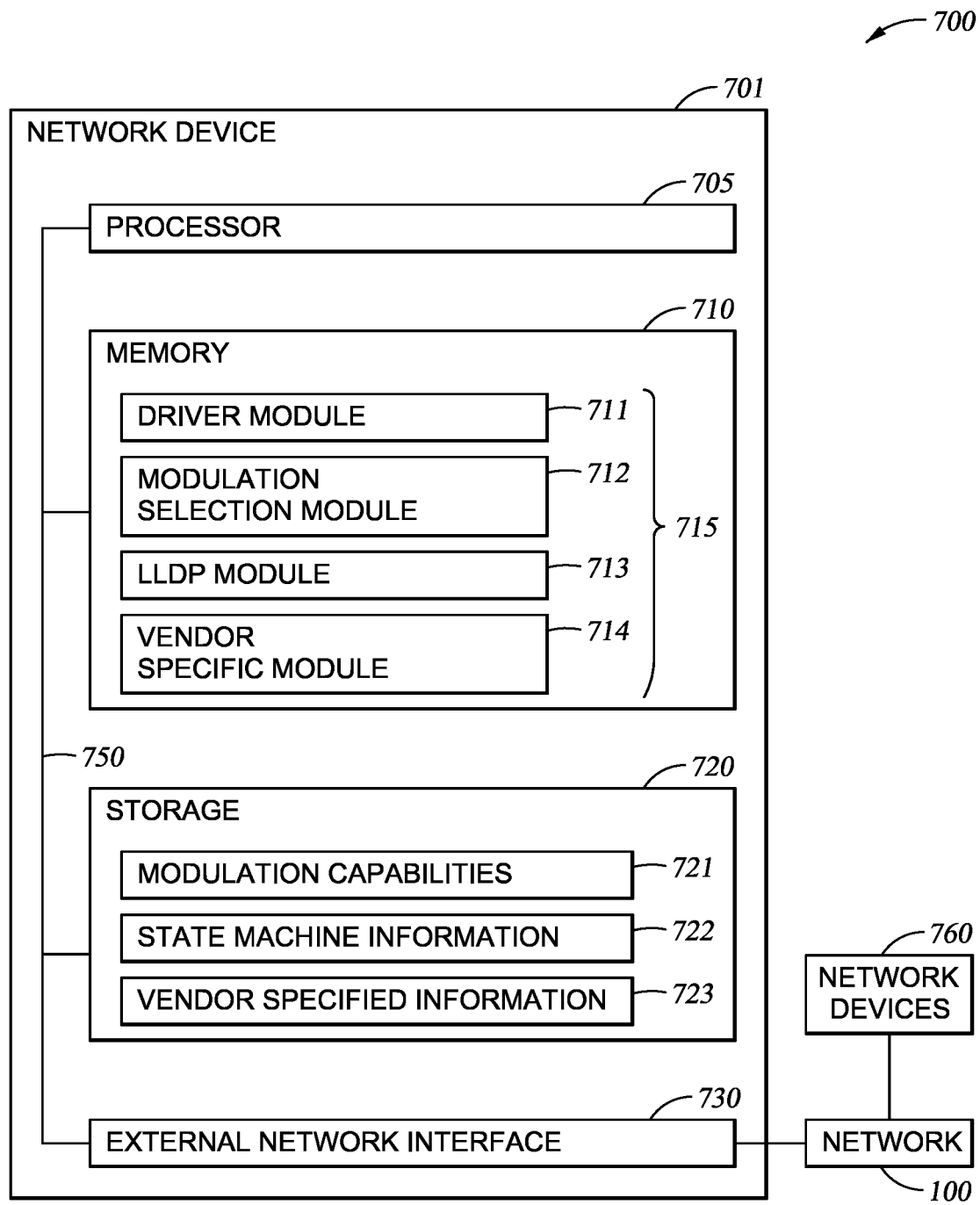
FIG. 7 is a block diagram of a network node, according to one embodiment.

FIG. 7 is a block diagram of a network device 701, such as either of the nodes 110 and 150. In some examples, the network device 701 is in the arrangement 700 including the network 100 and the network devices 760. The network device 701 may serve as either the primary node or the secondary node for an optical communication link such as the link 220 described herein. The network device 701 is shown in the form of a general-purpose computing device, but may include a server and/or application executing on a cloud network. The network device 701 may include, but is not limited to, one or more processing units or processors 705, a memory 710, a storage system 720, a network interface 730 connecting the network device 701 to the network 100, and a bus 750 that couples various system components including the memory 710 and storage system 720 to processors 705.

Bus 750 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network device 701 typically includes a variety of computer system readable media. Such media may be any available media that is accessible by the network device 701, and it includes both volatile and non-volatile media, removable and non-removable media.

Memory 710 can include computer system readable media in the form of volatile memory, such as random access memory (RAM) and/or cache memory. The network device 701 may further include other removable/non-removable, volatile/non-volatile computer system storage media. By way of example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 750 by one or more data media interfaces. As will be further depicted and described below, memory 710 may include at least one program product having a set (e.g., at least one) of program modules that are configured to carry out the functions of various embodiments described herein.

The network device 701 may further include other removable/non-removable, volatile/non-volatile computer system storage media. In some examples, the storage system 720 may be included as part of memory 710 and may typically provide a non-volatile memory for the networked computing devices, and may include one or more different storage elements such as Flash memory, a hard disk drive, a solid state drive, an optical storage device, and/or a magnetic storage device. For example, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. Storage system 720 may include media for modulation capabilities 721, state machine information 722, vendor specified information 723, and other information stored for access and use by the network device 701.

Memory 710 may include a plurality of modules 715 for performing various functions described herein in relation to FIGS. 2-6. The modules 715 generally include program code that is executable by one or more of the processors 705. As shown, modules 715 include the driver module 711, modulation selection module 712, LLDP module 713, and vendor specific module 714. The modules 715 may also interact with each other and storage system 720 to perform certain functions as described herein in relation to FIGS. 3-6.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   exchanging, in an optical based network, optical modulation information and node ability information between a first node and a second node;
   selecting the first node as a primary node and the second node as a secondary node based on the node ability information;
   monitoring, at the primary node, a link quality for a link between the primary and secondary nodes; and
   when the link quality is below a threshold, updating a modulation scheme for the primary and secondary nodes.

2. The method of claim 1, wherein exchanging the optical modulation information comprises:
   sending, from the first node, a first Link Layer Discovery Protocol (LLDP) type-length-value (TLV) structure to the second node, wherein the first LLDP TLV comprises available modulation capabilities at the first node and state machine functionality for the first node; and
   receiving a second LLDP TLV structure from the second node, wherein the second LLDP TLV structure comprises available modulation capabilities at the second node and state machine functionality for the second node.

3. The method of claim 2, wherein selecting the first node as the primary node and the second node as the secondary node comprises:
   determining a primary functionality for the first node and the second node;
   wherein when the first node is capable of primary functionality and the second node is not capable of primary functionality:
      setting the first node as the primary node, and
   wherein when the first node and second node are capable of primary functionality:
      determining a first source media access control (MAC) address for the first node;
      determining a second source MAC address for the second node;
      comparing the first source MAC address to the second source MAC address; and
      setting the first node as the primary node when the first source MAC address is higher than the second source MAC address.

4. The method of claim 2, wherein the method further comprises:
   selecting a first modulation scheme as an active modulation scheme based on the optical modulation information by:
      determining, from the available modulation capabilities at the first node and the available modulation capabilities at the second node, the first modulation scheme, wherein the first modulation scheme comprises a modulation scheme available to both the first node and the second node.

5. The method of claim 1, wherein the method further comprises: selecting a first modulation scheme as an active modulation scheme based on the optical modulation information by:
   causing a first digital coherent optics (DCO) module at the first node to transmit according to the first modulation scheme; and
   causing a second DCO module at the second node to transmit according to the first modulation scheme.

6. The method of claim 1, wherein monitoring the link between the primary and secondary nodes comprises:
   iteratively collecting first bit error ratio (BER) information for a network link between the first node and the second node at the first node; and
   receiving BER information collected at the secondary node; and
   receiving a link quality parameter from a user, wherein the link quality parameter comprises at least one link quality factor; and
   comparing the first BER information and the received BER to the link quality parameter.

7. The method of claim 6, wherein updating a modulation scheme for the primary and secondary nodes comprises:
   determining whether the link quality is acceptable or unacceptable,
   when the link quality is acceptable an active modulation continues use for the primary and secondary nodes, and
   when the link quality is unacceptable,
      determining, from available modulation capabilities at the primary node and the available modulation capabilities at the secondary node, a second modulation scheme, wherein the second modulation scheme comprises a modulation scheme available to both the first node and the second node,
      wherein the second modulation scheme comprises a lower modulation scheme when the link quality is error prone, and
      wherein the second modulation scheme comprises a higher modulation scheme when a speed of the link is low.

8. A system comprising:
   one or more computer processors; and
   a memory containing a program which when executed by the one or more computer processors performs an operation comprising:
      exchanging, in an optical based network, optical modulation information and node ability information between a first node and a second node;
      selecting the first node as a primary node and the second node as a secondary node based on the node ability information;
      monitoring, at the primary node, a link quality for a link between the primary and secondary nodes; and
      when the link quality is below a threshold, updating a modulation scheme for the primary and secondary nodes.

9. The system of claim 8, wherein exchanging the optical modulation information comprises:
   sending, from the first node, a first Link Layer Discovery Protocol (LLDP) type-length-value (TLV) structure to the second node, wherein the first LLDP TLV comprises available modulation capabilities at the first node and state machine functionality for the first node; and
   receiving a second LLDP TLV structure from the second node, wherein the second LLDP TLV structure comprises available modulation capabilities at the second node and state machine functionality for the second node.

10. The system of claim 9, wherein selecting the first node as the primary node and the second node as the secondary node comprises:
    determining a primary functionality for the first node and the second node;
    wherein when the first node is capable of primary functionality and the second node is not capable of primary functionality:
       setting the first node as the primary node, and wherein when the first node and second node are capable of primary functionality:
   determining a first source media access control (MAC) address for the first node;
   determining a second source MAC address for the second node;
   comparing the first source MAC address to the second source MAC address; and
   setting the first node as the primary node when the first source MAC address is higher than the second source MAC address.

11. The system of claim 9, wherein the operation further comprises:
   selecting a first modulation scheme as an active modulation scheme based on the optical modulation information by:
      determining, from the available modulation capabilities at the first node and the available modulation capabilities at the second node, the first modulation scheme, wherein the first modulation scheme comprises a modulation scheme available to both the first node and the second node.

12. The system of claim 8, wherein the operation further comprises:
   selecting a first modulation scheme as an active modulation scheme based on the optical modulation information by:
      causing a first digital coherent optics (DCO) module at the first node to transmit according to the first modulation scheme; and
      causing a second DCO module at the second node to transmit according to the first modulation scheme.

13. The system of claim 8, wherein monitoring the link between the primary and secondary nodes comprises:
   iteratively collecting first bit error ratio (BER) information for a network link between the first node and the second node at the first node; and
   receiving BER information collected at the secondary node; and
   receiving a link quality parameter from a user, wherein the link quality parameter comprises at least one link quality factor; and
   comparing the first BER information and the received BER to the link quality parameter.

14. The system of claim 8, wherein updating a modulation scheme for the primary and secondary nodes comprises:
   determining whether the link quality is acceptable or unacceptable,
   when the link quality is acceptable an active modulation continues use for the primary and secondary nodes, and
   when the link quality is unacceptable,
      determining, from available modulation capabilities at the primary node and the available modulation capabilities at the secondary node, a second modulation scheme, wherein the second modulation scheme comprises a modulation scheme available to both the first node and the second node,
      wherein the second modulation scheme comprises a lower modulation scheme when the link quality is error prone, and
   wherein the second modulation scheme comprises a higher modulation scheme when a speed of the link is low.

15. A computer program product comprising:
   a non-transitory computer-readable storage medium having computer-readable program code embodied therewith, where the computer-readable program code is executable by one or more computer processors to perform an operation, the operation comprising:
      exchanging, in an optical based network, optical modulation information and node ability information between a first node and a second node;
      selecting the first node as a primary node and the second node as a secondary node based on the node ability information;
      monitoring, at the primary node, a link quality for a link between the primary and secondary nodes; and
      when the link quality is below a threshold, updating a modulation scheme for the primary and secondary nodes.

16. The computer program product of claim 15, wherein exchanging the optical modulation information comprises:
   sending, from the first node, a first Link Layer Discovery Protocol (LLDP) type-length-value (TLV) structure to the second node, wherein the first LLDP TLV comprises available modulation capabilities at the first node and state machine functionality for the first node; and
   receiving a second LLDP TLV structure from the second node, wherein the second LLDP TLV structure comprises available modulation capabilities at the second node and state machine functionality for the second node.

17. The computer program product of claim 16, wherein selecting the first node as the primary node and the second node as the secondary node comprises:
   determining a primary functionality for the first node and the second node;
   wherein when the first node is capable of primary functionality and the second node is not capable of primary functionality:
      setting the first node as the primary node, and
   wherein when the first node and second node are capable of primary functionality:
      determining a first source media access control (MAC) address for the first node;
      determining a second source MAC address for the second node;
      comparing the first source MAC address to the second source MAC address; and
      setting the first node as the primary node when the first source MAC address is higher than the second source MAC address; and
   wherein the operation further comprises:
      selecting a first modulation scheme as an active modulation scheme based on the optical modulation information by:
         determining, from the available modulation capabilities at the first node and the available modulation capabilities at the second node, the first modulation scheme, wherein the first modulation scheme comprises a modulation scheme available to both the first node and the second node.

18. The computer program product of claim 15, wherein the operation further comprises:
   selecting a first modulation scheme as an active modulation scheme based on the optical modulation information by:
      causing a first digital coherent optics (DCO) module at the first node to transmit according to the first modulation scheme; and
      causing a second DCO module at the second node to transmit according to the first modulation scheme.

19. The computer program product of claim 15, wherein monitoring the link between the primary and secondary nodes comprises:
- iteratively collecting first bit error ratio (BER) information for a network link between the first node and the second node at the first node; and
- receiving BER information collected at the secondary node; and
- receiving a link quality parameter from a user, wherein the link quality parameter comprises at least one link quality factor; and
- comparing the first BER information and the received BER to the link quality parameter.

20. The computer program product of claim 15, wherein updating a modulation scheme for the primary and secondary nodes comprises:
- determining whether the link quality is acceptable or unacceptable,
- when the link quality is acceptable an active modulation continues use for the primary and secondary nodes, and
- when the link quality is unacceptable,
  - determining, from available modulation capabilities at the primary node and the available modulation capabilities at the secondary node, a second modulation scheme, wherein the second modulation scheme comprises a modulation scheme available to both the first node and the second node,
  - wherein the second modulation scheme comprises a lower modulation scheme when the link quality is error prone, and
  - wherein the second modulation scheme comprises a higher modulation scheme when a speed of the link is low.

* * * * *